United States Patent
Chiam et al.

(10) Patent No.: US 10,954,733 B2
(45) Date of Patent: Mar. 23, 2021

(54) SINGLE-LINE CONTROL SYSTEM FOR A WELL TOOL

(71) Applicant: Halliburton Energy Services, Inc., Houston, TX (US)

(72) Inventors: Zun Kai Chiam, Singapore (SG); Koteeshwaran Krishnamoorthi, Singapore (SG); Qian Yu Neo, Singapore (SG); Santhakumar Kunnasegaran, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 204 days.

(21) Appl. No.: 16/308,726

(22) PCT Filed: Dec. 29, 2017

(86) PCT No.: PCT/US2017/068873
§ 371 (c)(1),
(2) Date: Dec. 10, 2018

(87) PCT Pub. No.: WO2019/132951
PCT Pub. Date: Jul. 4, 2019

(65) Prior Publication Data
US 2020/0318448 A1    Oct. 8, 2020

(51) Int. Cl.
*E21B 23/04* (2006.01)
*E21B 34/10* (2006.01)

(52) U.S. Cl.
CPC .......... *E21B 23/0421* (2020.05); *E21B 23/04* (2013.01); *E21B 34/10* (2013.01); *E21B 34/102* (2013.01)

(58) Field of Classification Search
CPC ................................ E21B 23/04; E21B 34/10
See application file for complete search history.

(56) References Cited

U.S. PATENT DOCUMENTS

| 666,893 A | 1/1901 | Beamond et al. |
| 6,125,938 A | 10/2000 | Garcia-Soule et al. |
| 6,179,052 B1 | 1/2001 | Purkis et al. |
| 6,470,970 B1 | 10/2002 | Purkis et al. |

(Continued)

FOREIGN PATENT DOCUMENTS

| CN | 105888565 | 8/2016 |
| WO | 9954591 | 10/1999 |
| WO | 2016176677 | 11/2016 |

OTHER PUBLICATIONS

International Patent Application No. PCT/US2017/068873, International Search Report and Written Opinion, dated Sep. 20, 2018, 15 pages.

*Primary Examiner* — Giovanna Wright
(74) *Attorney, Agent, or Firm* — Kilpatrick Townsend & Stockton LLP (57) ABSTRACT

A control system can include a resettable chamber and a bidirectional valve. The bidirectional valve can be switchable between (i) a first configuration for enabling fluid flow from the control line into a first port of a well tool and from a second port of the well tool into the resettable chamber, and (ii) a second configuration for enabling fluid flow from the control line into the second port of the well tool and from the first port of the well tool into the resettable chamber. The bidirectional valve can be switched from the first configuration to the second configuration in response to pressure being applied to the control line.

20 Claims, 5 Drawing Sheets

(56) References Cited

U.S. PATENT DOCUMENTS

| | | |
|---|---|---|
| 6,536,530 B2 | 3/2003 | Schultz et al. |
| 6,591,914 B2 | 7/2003 | Williamson et al. |
| 6,595,296 B1 | 7/2003 | French et al. |
| 7,168,493 B2 | 1/2007 | Eddison et al. |
| 7,182,139 B2 | 2/2007 | Rayssiguier et al. |
| 7,503,385 B2 | 3/2009 | Tips et al. |
| 8,220,773 B2 | 7/2012 | Gustafson |
| 8,550,155 B2 | 10/2013 | Schultz et al. |
| 8,727,013 B2 | 5/2014 | Buckley et al. |
| 9,175,538 B2 | 11/2015 | Wordley et al. |
| 2005/0178560 A1 | 8/2005 | Johansen et al. |
| 2006/0254763 A1 | 11/2006 | Tips et al. |
| 2010/0212910 A1 | 8/2010 | James |
| 2011/0100645 A1 | 5/2011 | Yapici |
| 2012/0067593 A1 | 3/2012 | Powell et al. |
| 2016/0047189 A1 | 2/2016 | MacLeod et al. |
| 2016/0118209 A1 | 4/2016 | Shaw et al. |
| 2016/0168948 A1 | 6/2016 | Shaw et al. |

SINGLE-LINE CONTROL SYSTEM FOR A WELL TOOL

TECHNICAL FIELD

The present disclosure relates generally to control systems for well tools. More specifically, but not by way of limitation, this disclosure relates to a single-line control system for a well tool.

BACKGROUND

A well system (e.g., an oil or gas well for extracting fluid or gas from a subterranean formation) can include a wellbore drilled into a subterranean formation. Well tools can be positioned in the wellbore for performing various tasks. Some well tools can be controlled while in the wellbore using a hydraulic control system or another fluid-based control system.

DETAILED DESCRIPTION

Certain aspects and features of the present disclosure relate to a control system capable of switching a well tool between at least two settings in response to pressure changes on a single control line. The control line can extend from a surface of a wellbore downhole to the control system, which can be incorporated into the well tool (or otherwise coupled to the well tool) for controlling the well tool. A control unit at the surface of the wellbore can apply pressure to the control line, which can cause the control system to switch the well tool from one setting to another setting. For example, the control unit can apply pressure to the control line to cause the control system to switch a valve in the well tool from a closed position to an open position. The control unit can then apply a different amount of pressure to the control line to cause the control system to switch the well tool back to the original setting. For example, the control unit can apply more pressure to the control line to cause the control system switch the valve in the well tool from the open position to the closed position.

In some examples, the control system includes a resettable chamber and a bidirectional valve in fluid communication with the control line. The bidirectional valve can be biased (e.g., by a spring or other biasing device) in a first configuration for enabling fluid flow from (i) the control line into a first port of a well tool, and (ii) from a second port of the well tool into the resettable chamber.

The well tool can begin in an initial setting, in which a piston in the well tool is biased toward the first port of the well tool. To switch the well tool from the initial setting to a new setting, pressure can be applied to the control line to cause fluid to flow into the first port of the well tool. The fluid can push the piston in the well tool from an initial position to a new position, changing the setting of the well tool from the initial setting to a new setting. Movement of the piston can also cause fluid already present in the well tool to be expunged out the second port of the well tool and transmitted into the resettable chamber.

To switch the well tool back to the initial setting, additional pressure can be applied to the control line. If the pressure is sufficient to overcome the force with which the bidirectional valve is biased in the first configuration, the bidirectional valve can switch to a second configuration. The second configuration can reverse the direction of fluid flow through the control system, enabling fluid flow from (i) the control line into the second port of the well tool, and (ii) from the first port of the well tool into the resettable chamber. As fluid flows from the control line into the second port of the well tool, the fluid can push the piston in the well tool back toward the initial position, changing the setting of the well tool back to the initial setting. Movement of the piston can also cause fluid already present in the well tool to be expunged out the first port of the well tool and transmitted into the resettable chamber.

Some control systems of the present disclosure are cheaper, faster, and less challenging to install than other types of control systems. For example, the abovementioned control system can switch the well tool between multiple settings using only a single control line. This can eliminate or reduce the need for a second control line (e.g., a return control line), which can be expensive, difficult, and time consuming to install. Also, some control systems of the present disclosure can only have fluid-operated components, rather than electrical components, which can be expensive, unreliable, difficult to install, can require a separate electrical line for operation, and may not be as conducive to fluctuating downhole conditions. Further, some control systems of the present disclosure expunge fluid into a resettable chamber, which can enable these control systems to operate at a lower pressure level than other types of control systems (e.g., control systems that expunge fluid into an annulus of the wellbore and therefore need additional pressure on top of the annulus pressure to function).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
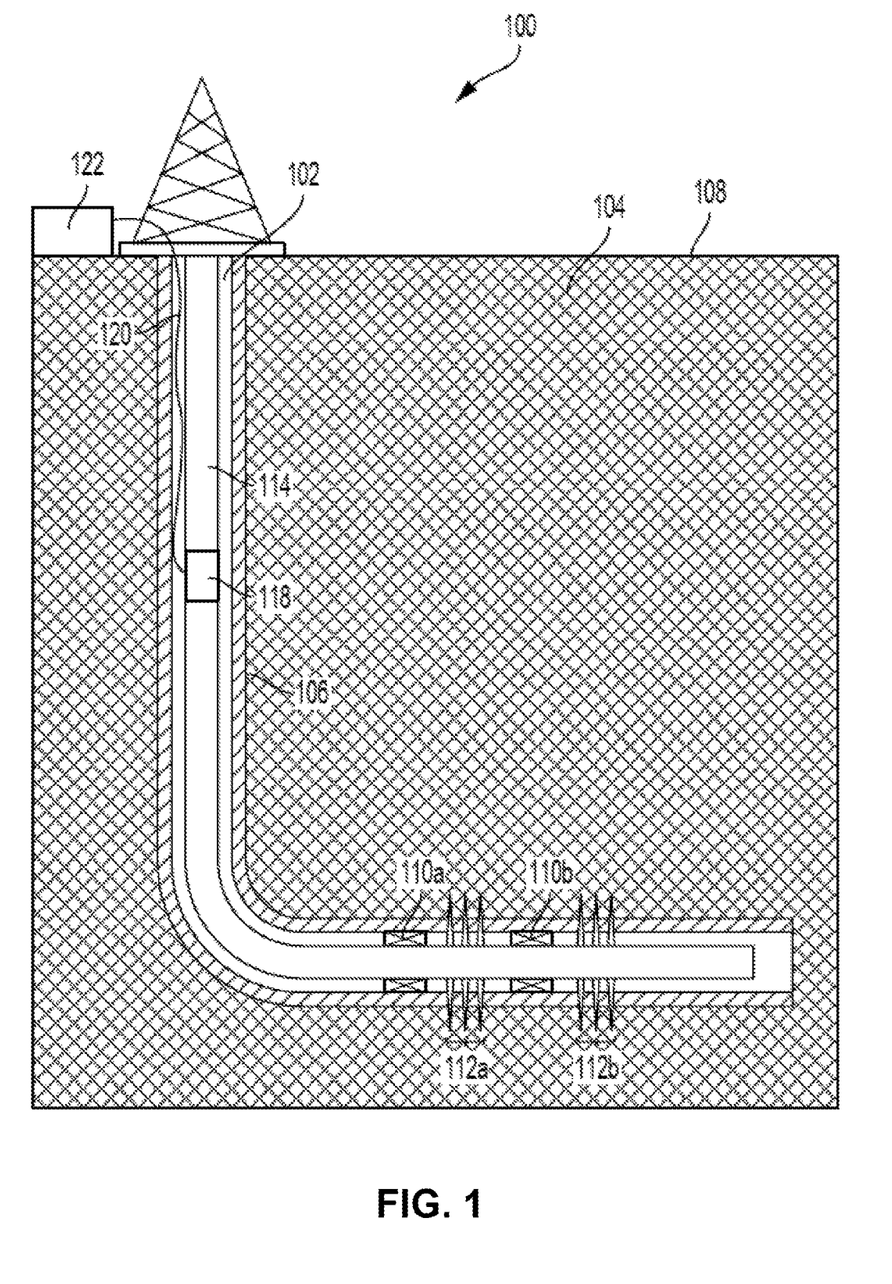
FIG. 1 is a cross-sectional view of an example of a well system that includes a control system for a well tool according to some aspects.

FIG. 1 is a cross-sectional view of an example of a well system 100 that includes a control system 118 for a well tool 114 according to some aspects. The well system 100 includes a wellbore 102 extending through a hydrocarbon bearing subterranean formation 104. In this example, the wellbore 102 is partially vertical and partially horizontal, but in other examples the wellbore 102 can have other shapes.

In this example, the wellbore 102 includes a casing string 106 (e.g., a metal casing) extending from the well surface 108 into the subterranean formation 104. The casing string 106 can provide a conduit through which injection fluids or formation fluids, such as production fluids produced from the subterranean formation 104, can travel. In other examples, the wellbore 102 can lack the casing string 106.

The wellbore 102 can include a well tool 114 for performing one or more tasks in the wellbore 102. Examples of the well tool 114 can include a tubing string, a safety tool, valve tool, packer tool, a production tool, drilling tool, monitoring tool, formation testing tool, a logging while drilling tool, or any combination of these. In the example shown in FIG. 1, the well tool 114 includes a production tubing extending downhole. The production tubing includes packers 110a-b, which can create seals between the production tubing and a wall of the wellbore 102. The seals can form isolated production zones 112a-b from which production fluids can flow into the production tubing.

The well tool 114 can include (or can be coupled to) a control system 118. The control system 118 can be a fluid-based control system that can lack electrical components and can only require a single control-line to operate. For example, the control system 118 can be a hydraulic-fluid based control system that only requires control line 120 to operate. The control line 120 can extend from the control system 118 uphole to a control unit 122, which may or may not be positioned at the well surface 108. In some examples, the control unit 122 can include a pump or valve. The control unit 122 can communicate fluid, pressure, or both to the control system 118 via the control line 120, which can cause the control system 118 to operate the well tool 114 in various ways.

As a particular example, the well tool 114 can include a valve for enabling or disabling production fluids to flow to the well surface 108. To open the valve, the control unit 122 can apply pressure to the control line 120, which in turn applies the pressure to the control system 118. The control system 118 can respond to the pressure by causing the valve to open. To close the valve, the control unit 122 can apply a different amount of pressure to the control line 120. The control system 118 can respond to the different amount of pressure by causing the valve to close.

Although the above example relates to opening and closing a valve in the well tool 114, in other examples the control system 118 can switch any suitable well-tool component (e.g., valve, pump, etc.) of the well tool 114 between any number and combination of settings. For example, the control system 118 can switch the well-tool component between three or more settings by, for example, applying three or more different pressures to the control line 120. In some examples, the control system 118 may operate multiple well-tool components within a single well tool 114 to control the well tool 114 in any number and combination of ways.

The well system 100 of FIG. 1 is shown for illustrative purposes only. While FIG. 1 depicts an onshore well system, in other examples, the well system 100 may be located offshore (e.g., at least partially beneath the ocean's surface). Also, in other examples, the well system 100 may lack one or more features shown in FIG. 1, include features not shown in FIG. 1, or both.

Figure 2:
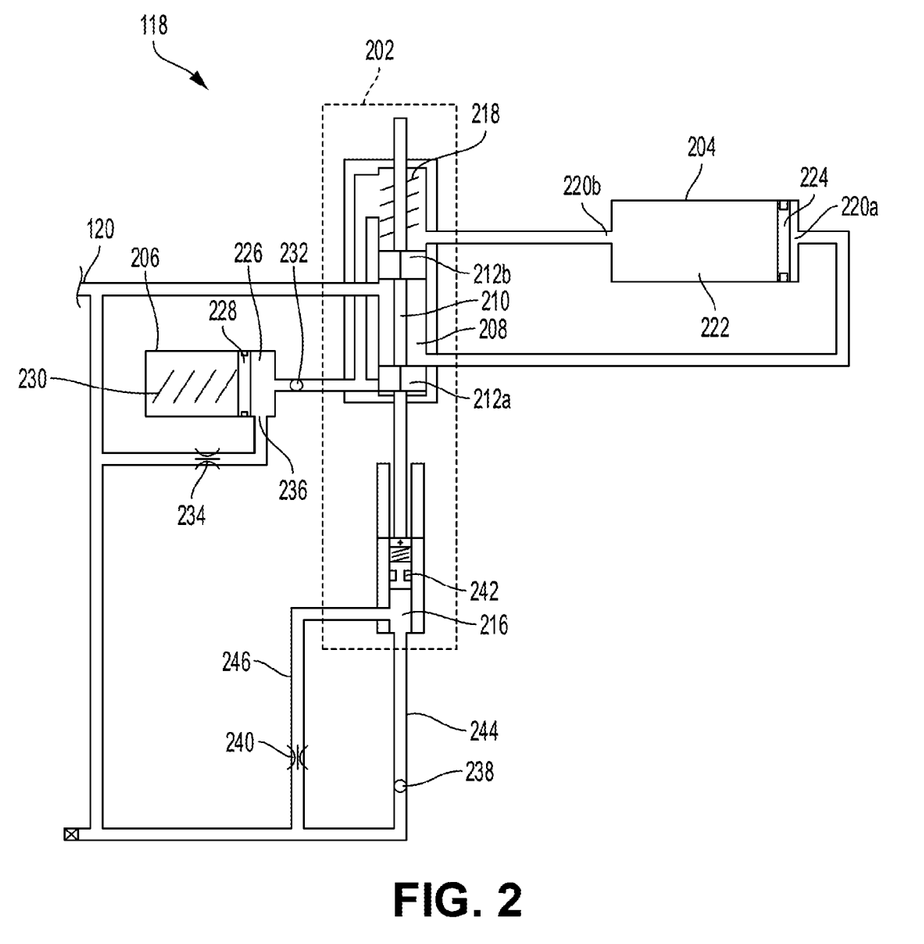
FIG. 2 is a schematic view of an example of the control system of FIG. 1 according to some aspects.

FIG. 2 is a schematic view of an example of the control system 118 of FIG. 1 according to some aspects. In this example, the control system 118 includes a bidirectional valve 202. The bidirectional valve 202 can include a first valve chamber 208, which can have ends defined by sealing components 212a-b (e.g., O-rings). The sealing components 212a-b can seal fluid within the first valve chamber 208 to prevent the fluid from leaking into other portions of the bidirectional valve 202, and vice-versa. The bidirectional valve 202 can also include a second valve chamber 216. A sealing component 242 can define an end of the second valve chamber 216. A piston 210 can extend through the first valve chamber 208. The sealing components 212a-b, 242 can be coupled to the piston 210 and move in unison with the piston 210.

Figure 3:
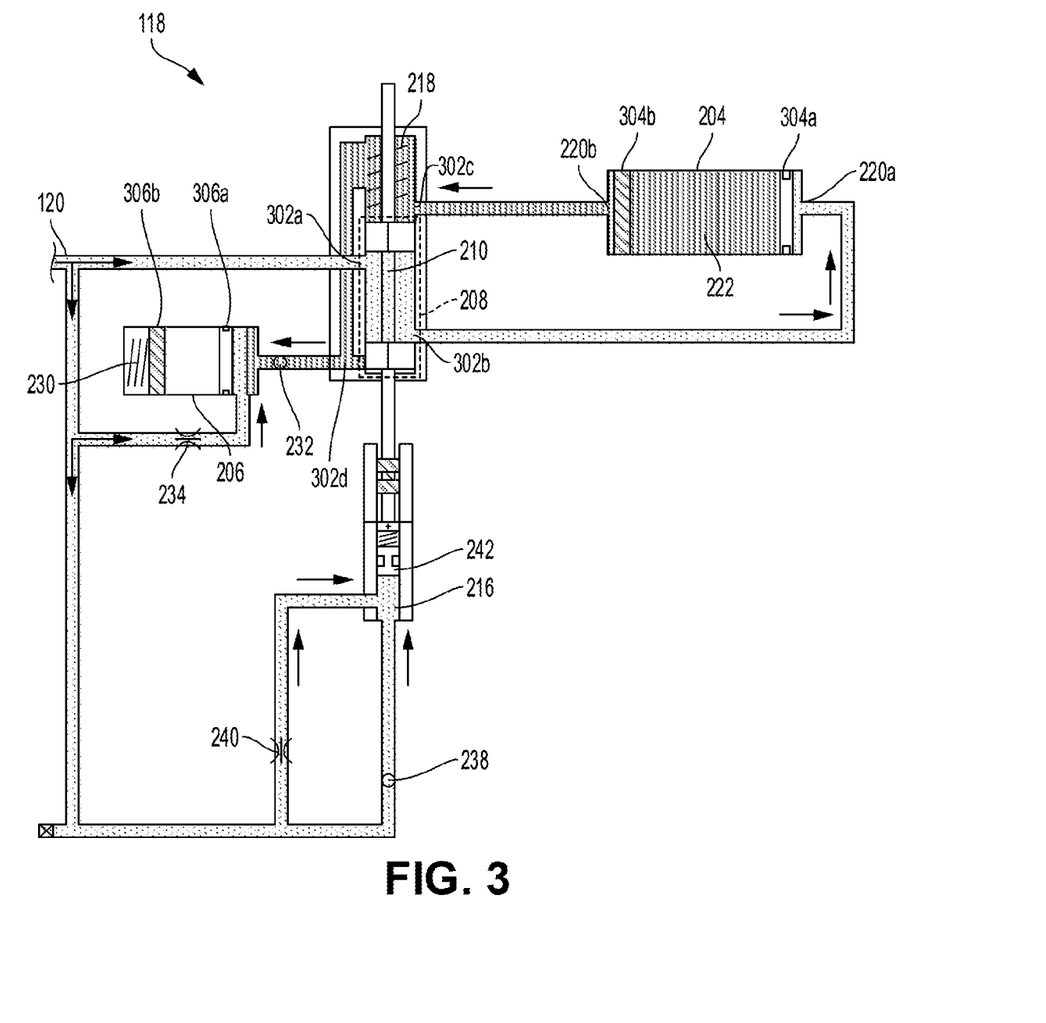
FIG. 3 is a schematic view of an example of the control system of FIG. 2 in one state according to some aspects.
Figure 4:
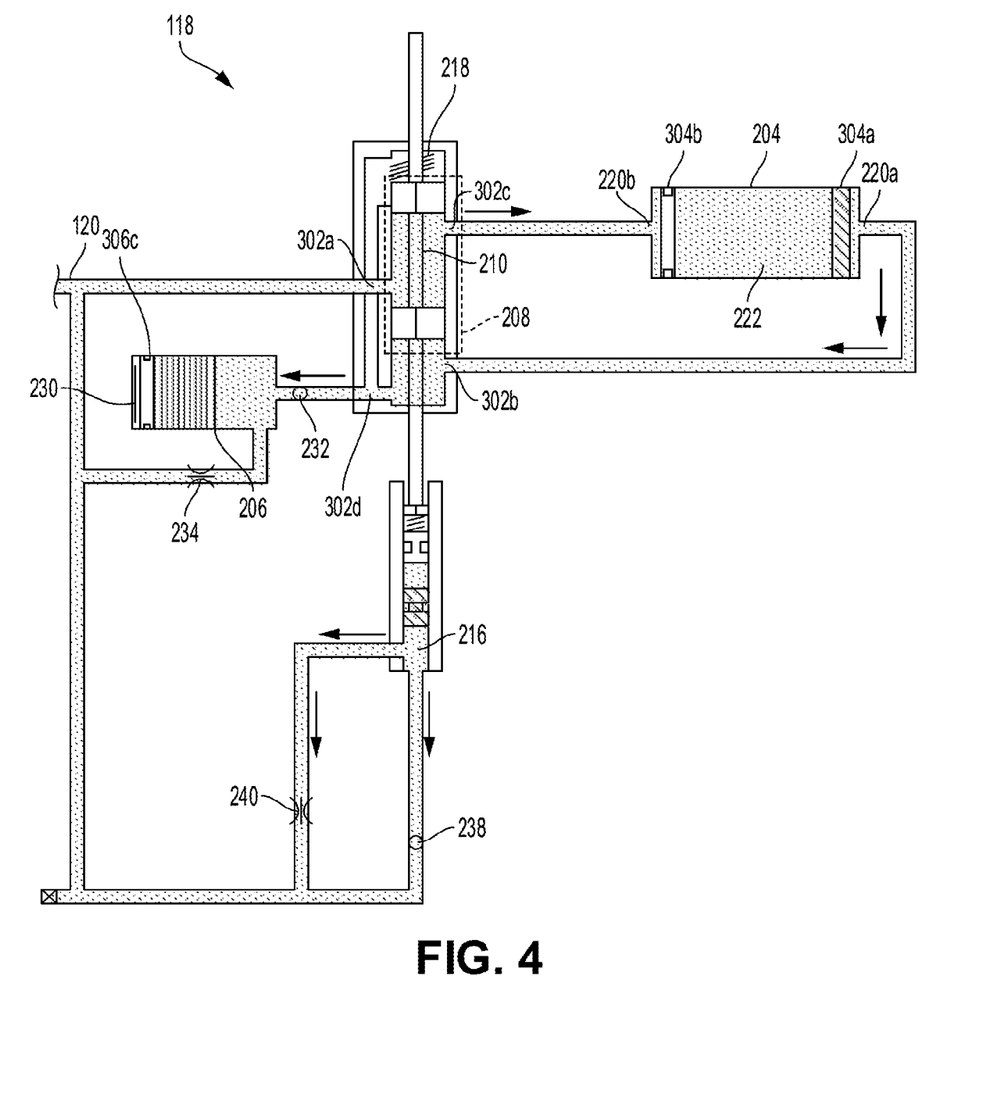
FIG. 4 is a schematic view of an example of the control system of FIG. 2 in another state according to some aspects.

In some examples, the bidirectional valve 202 includes a biasing device 218 (e.g., a spring, gas, fluid, etc.), which can bias the bidirectional valve 202 in a first configuration by default. An example of the first configuration is shown in FIGS. 2-3. When sufficient pressure is applied to the bidirectional valve 202 to overcome a force of the biasing device 218, the bidirectional valve 202 can switch to a second configuration. An example of such a pressure is 2000 pounds per square inch (psi), and an example of the second configuration is shown in FIG. 4.

The control system 118 also includes a well-tool component 204. In this example, the well-tool component 204 has a fluid chamber 222 and a piston 224 that is movable between a first piston position (e.g., the right) for performing a first well task and a second piston position (e.g., the left) for performing a second well task. The piston 224 can move from the first piston position to the second piston position based on fluid being communicated into a first port 220a, and from the second piston position to the first piston position based on fluid being communicated into a second port 220b. The piston 224 can include one or more sealing devices for preventing fluid communication between the side of the fluid chamber 222 that includes the first port 220a and the other side of the fluid chamber 222 that includes the second port 220b. Other examples can include other types of well-tool components.

The control system 118 can also include a resettable chamber 206. The resettable chamber 206 includes a chamber 226 for fluid, whereby the chamber 226 is defined on at least one side by a piston, which can also be referred to as a chamber piston 228. The chamber piston 228 can move within the chamber 226. For example, the chamber piston 228 can be biased in a first position (e.g., to the right) within the chamber 226 by a biasing device 230. As fluid enters the chamber 226, the chamber piston 228 can be pushed toward a second position (e.g., to the left). The biasing device 230 may resist movement of the chamber piston 228 toward the second position by exerting a counter force on the chamber piston 228. In some examples, after sufficient fluid pressure is removed from the chamber piston 228, the biasing device 230 can push the chamber piston 228 back to the first position, thereby "resetting" the chamber 226. In some examples, the chamber piston 228 can include one or more sealing devices for preventing fluid communication between the chamber 226 and the area of the resettable chamber 206 that includes the biasing device 230.

The control system 118 can additionally or alternatively include other components. For example, the control system 118 can include a check valve 232 positioned between the bidirectional valve 202 and the resettable chamber 206. The check valve 232 may only allow fluid to flow in a single direction, such as from the bidirectional valve 202 towards the resettable chamber 206. Additionally or alternatively, the control system 118 can include a restrictor device 234 positioned between a port 236 of the resettable chamber 206 and the control line 120. The restrictor device 234 can restrict the amount of fluid flowing between the resettable chamber 206 and the control line 120. Additionally or alternatively, the control system 118 can include a check valve 238 positioned in a first fluid communication pathway 244 between the second valve chamber 216 of the bidirectional valve 202 and the control line 120. The check valve 238 may only allow fluid to flow in one direction, such as from the control line 120 toward the second valve chamber

216. Additionally or alternatively, the control system 118 can include a restrictor device 240 positioned in a second fluid communication pathway 246 between the second valve chamber 216 of the bidirectional valve 202 and the control line 120. The restrictor device 240 can restrict the amount of fluid flowing between the second valve chamber 216 and the control line 120. The control system 118 can include any number (including zero) and combination of the abovementioned components, as well as other valves, restrictor devices, chambers, and components.

When the control system 118 is in the state shown in FIG. 2, the piston of the well-tool component 204 is biased in the depicted position with a first amount of pressure, such as 1000 psi. And the piston of the resettable chamber 206 is biased in the depicted position (e.g., via biasing device 230) with a second amount of pressure, such as 200 psi. And the piston 210 of the bidirectional valve can be biased in the depicted position (e.g., via biasing device 218) with a third amount of pressure, such as 2000 psi. The first amount of pressure and the second amount of pressure can be any combination of pressures that has a sum that is less than the third amount of pressure. The biasing device 218 can maintain the bidirectional valve in the depicted configuration when the pressure applied to the control system 118 by the control line 120 is less than the third amount of pressure.

Referring now to FIG. 3, to move the piston in the well-tool component 204 from a first piston position 304a to a second piston position 304b, pressure can be applied to the control line 120. If the pressure applied to the control line 120 is greater than the sum of the first amount of pressure and the second amount of pressure (e.g., 1500 psi), but less than the third amount of pressure, then the pressure can move the piston of the well-tool component 204 from the first piston position 304a to the second piston position 304b, without causing the bidirectional valve to switch into another configuration. As the piston in the well-tool component 204 shifts from the first piston position 304a to the second piston position 304b, existing fluid in the well-tool component 204 can be displaced into the resettable chamber 206 via check valve 232. In some examples, the resettable chamber 206 is of sufficient size to hold a combination of the existing fluid in the well-tool component 204 and any fluid that passes from the control line 120 through the restrictor device 234 into the resettable chamber 206.

More specifically, to move the piston in the well-tool component 204 from the first piston position 304a to the second piston position 304b, pressure can be applied to the control line 120, causing fluid to flow through the first valve chamber 208 of the bidirectional valve and into the first port 220a of the well-tool component 204. The direction of fluid flow from the control line 120 through the control system 118 is indicated by dashed arrows and shown in a first shading pattern in FIG. 3. Transmitting the fluid into the first port 220a of the well-tool component 204 can cause the piston in the well-tool component 204 to move from the first piston position 304a to a second piston position 304b. The well tool may perform a second well task when the piston in the well-tool component 204 is in the second piston position 304b.

Movement of the piston in the fluid chamber 222 from the first piston position 304a to the second piston position 304b can also cause other fluid that is already present in the fluid chamber 222 of the well-tool component 204 to be transmitted out the second port 220b of the well-tool component 204 and into a third port 302c of the bidirectional valve. The other fluid from the well-tool component 204 is shown in a second shading pattern in FIG. 3. The bidirectional valve can transmit the other fluid out a fourth port 302d of the bidirectional valve and into the resettable chamber 206 via check valve 232, which can prevent fluid flow in the opposite direction. Transmitting the other fluid into the resettable chamber 206 can cause the chamber piston in the resettable chamber 206 to move from a first chamber position 306a toward a second chamber position 306b, whereby biasing device 230 can exert a counter force on the chamber piston.

As fluid is being communicated through the control system 118 as discussed above, the control line 120 can also communicate fluid through the restrictor device 234 and into the resettable chamber 206. The restrictor device 234 can prevent too much fluid from being communicated into the resettable chamber 206 from the control line 120, which can enable the other fluid from the well-tool component 204 to be transmitted into the resettable chamber 206.

Additionally, the control line 120 can communicate fluid through the restrictor device 240, the check valve 238, or both into the second valve chamber 216 of the bidirectional valve. As the second valve chamber 216 fills with fluid, the fluid can push against a sealing component 242. As mentioned above, if the amount of pressure applied to the control line 120 is less than the amount of force exerted by the biasing device 218 of the bidirectional valve, the biasing device 218 can maintain the bidirectional valve in the depicted configuration, despite the fluid pressing against the sealing component 242.

In some examples, after the piston of the well-tool component 204 is in the second piston position 304b, a well operator or a control unit (e.g., control unit 122 of FIG. 1) can bleed out or otherwise reduce the pressure in the control system 118. The well-tool component 204 can have a balanced design such that its piston of the well-tool component 204 remains in the second piston position 304b after the pressure in the control system 118 is reduced.

To move the piston in the well-tool component 204 from the second piston position 304b to the first piston position 304a, a sufficient amount of pressure (e.g., 2500 psi) can be applied to the control line 120 to overcome the force exerted by the biasing device 218. This can enable fluid in the second valve chamber 216 to move the sealing component 242, which in turn can move the piston 210 of the bidirectional valve, compressing the biasing device 218 and causing the bidirectional valve to switch into another configuration. An example of the other configuration is shown in FIG. 4.

When the bidirectional valve is in the configuration shown in FIG. 4, fluid can flow in the opposite direction, causing the piston in the well-tool component 204 to shift from the second piston position 304b to the first piston position 304a. The direction of fluid flow is indicated by dashed arrows in FIG. 4. As the piston in the well-tool component 204 shifts from the second piston position 304b to the first piston position 304a, existing fluid in the well-tool component 204 can be displaced into the resettable chamber 206 via check valve 232. In some examples, switching the bidirectional valve to the configuration shown in FIG. 4 can cause the pressure in the control system 118 to decrease. Because the volume of fluid in the fluid chamber 222 may be significantly less than the volume of fluid in the control line 120 up to the surface, the pressure loss may be negligible. But the restrictor device 240 can prevent an immediate loss of pressure in the second valve chamber 216, while retaining the bidirectional valve in the depicted configuration.

More specifically, to move the piston in the well-tool component 204 from the second piston position 304b to the first piston position 304a, fluid can flow through ports 302a, 302c and into the second port 220b of the well-tool component 204. Transmitting the fluid into the second port 220b of the well-tool component 204 can cause the piston in the well-tool component 204 to move from the second piston position 304b to the first piston position 304a.

Movement of the piston from the second piston position 304b to the first piston position 304a can also cause fluid in the fluid chamber 222 of the well-tool component 204 to be transmitted out the first port 220a of the well-tool component 204 and into the second port 302b of the bidirectional valve. The bidirectional valve can transmit the fluid out the fourth port 302d of the bidirectional valve and into the resettable chamber 206 via the check valve 232, which can prevent fluid flow in the opposite direction. Transmitting the fluid into the resettable chamber 206 can cause the chamber piston in the resettable chamber 206 to move further, from the second chamber position 306b to a third chamber position 306c, whereby biasing device 230 can exert additional counter force on the chamber piston.

In some examples, operating the control system 118 to move the piston of the well-tool component 204 from the first piston position 304a to the second piston position 304b, and then back to the first piston position 304a again, can collectively be referred to as a cycle. After a single cycle, the control system 118 may be highly pressurized. Pressure in the control system 118 may need to be reduced before another cycle can be performed. In some examples, a well operator or a control unit may bleed off or otherwise reduce the pressure in the control system 118 to enable the bidirectional valve and the resettable chamber 206 to return to their original states (e.g., as shown in FIG. 2). This may enable another cycle to subsequently be performed.

In some examples, the control system 118 can control a well tool using only a single control line (e.g., control line 120). For example, the well tool can be controlled to perform at least two different well tasks by applying different amounts of pressure to a single control line. Such a control system 118 may be cheaper, easier, and less time consuming to implement than other types of control systems, such as control systems that require two or more control lines. For example, it may be cheaper, easier, and less time consuming to run a single control line from the well surface to a well tool in a wellbore (e.g., to control the well tool) than to run two or more control lines from the well surface to the well tool.

Figure 5:
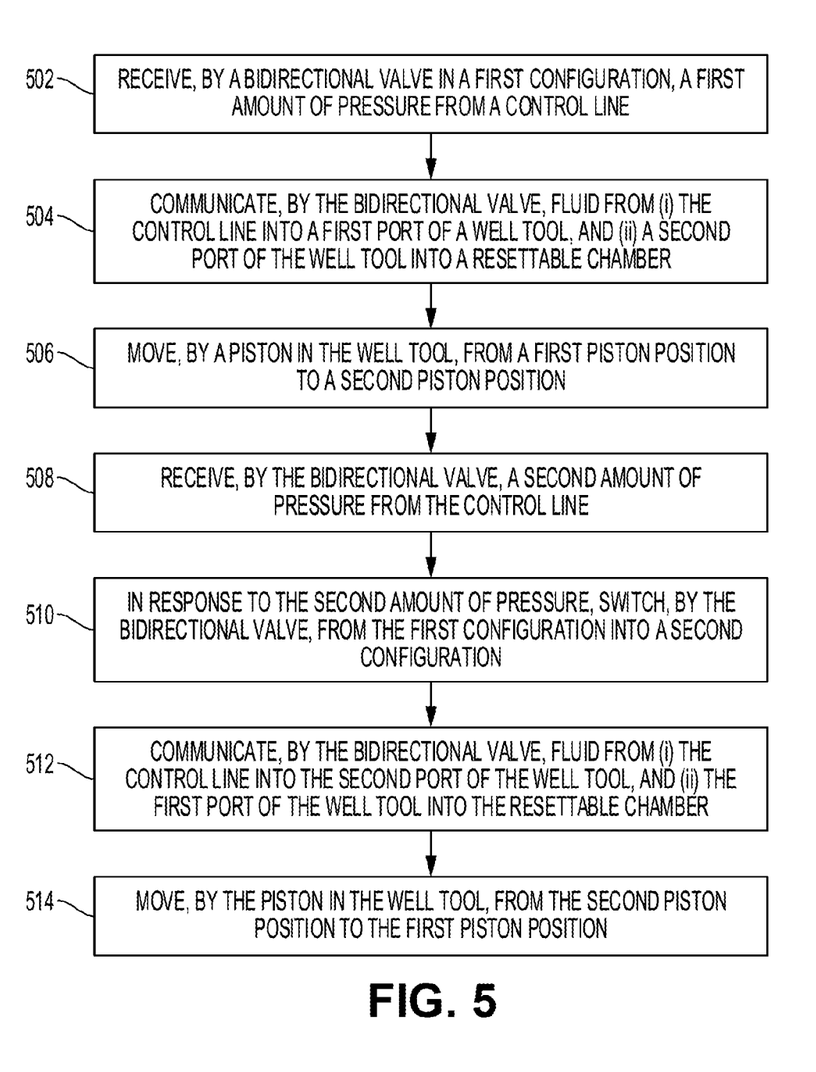
FIG. 5 is a flow chart of an example of a process for operating a control system for a well tool according to some aspects.

FIG. 5 is a flow chart of an example of a process for operating a control system for a well tool according to some aspects. Some examples can include more steps, fewer steps, different steps, or a different order of the steps than depicted in FIG. 5. The steps below will be described with reference to the components discussed above.

In block 502, a bidirectional valve 202 receives a first amount of pressure from a control line 120 that is in fluid communication with the bidirectional valve 202. The bidirectional valve 202 can receive the first amount of pressure when the bidirectional valve 202 is in a first configuration. The first amount of pressure can be less than a force with which a biasing device 218 is biasing the bidirectional valve 202 in the first configuration.

In block 504, the bidirectional valve 202 communicates fluid (i) from the control line 120 into a first port 220a of a well-tool component 204, and (ii) from a second port 220b of the well-tool component 204 into a resettable chamber 206. The bidirectional valve 202 can communicate the fluid in this manner based on the bidirectional valve 202 being in the first configuration and the first amount of pressure.

In block 506, a piston 224 of the well-tool component 204 moves from a first piston position 304a to a second piston position 304b in response to the fluid being communicated by the bidirectional valve 202 into the first port 220a of the well-tool component 204.

In block 508, the bidirectional valve 202 receives a second amount of pressure from the control line 120. The second amount of pressure can be greater than a force with which a biasing device 218 is biasing the bidirectional valve 202 in the first configuration.

In block 510, the bidirectional valve 202 responds to the second amount of pressure by switching from the first configuration into a second configuration.

In block 512, the bidirectional valve 202 communicates fluid (i) from the control line 120 into the second port 220b of the well-tool component 204, and (ii) from the first port 220a of the well-tool component 204 into the resettable chamber 206. The bidirectional valve 202 can communicate the fluid in this manner based on the bidirectional valve 202 being in the second configuration and the second amount of pressure.

In block 514, the piston 224 of the well-tool component 204 moves from the second piston position 304b to the first piston position 304a in response to the fluid being communicated by the bidirectional valve 202 into the second port 220b of the well-tool component 204.

In some aspects, a single-line control system for a well tool can be implemented according to one or more of the following examples:

Example #1

A control system can include a resettable chamber in fluid communication with a control line. The control system can include a bidirectional valve in fluid communication with the control line and the resettable chamber. The bidirectional valve can be switchable between (i) a first configuration for enabling fluid flow from the control line into a first port of a well tool and from a second port of the well tool into the resettable chamber, and (ii) a second configuration for enabling fluid flow from the control line into the second port of the well tool and from the first port of the well tool into the resettable chamber. The bidirectional valve can be switchable from the first configuration to the second configuration in response to an amount of pressure being applied to the control line.

Example #2

The control system of Example #1 may feature the resettable chamber including a biasing device for biasing a chamber piston in a first chamber position. The chamber piston can be movable from (i) the first chamber position to a second chamber position in response to fluid from the well tool being communicated into the resettable chamber, and (ii) the second chamber position to a third chamber position in response to additional fluid being communicated from the well tool into the resettable chamber.

Example #3

The control system of any of Examples #1-2 may feature a check valve positioned between the bidirectional valve and the resettable chamber. The check valve can be operable to enable fluid flow in a single direction from the bidirectional valve into the resettable chamber.

Example #4

The control system of any of Examples #1-3 may feature a restrictor device positioned between a port of the resettable chamber and the control line for restricting an amount of fluid flowing between the resettable chamber and the control line.

Example #5

The control system of any of Examples #1-4 may feature the biasing device being a first biasing device. The control system may feature the bidirectional valve can including a piston. A first valve chamber can be defined by at least two sealing devices coupled to the piston. A second valve chamber that is different from the first valve chamber can be defined at least in part by a sealing device coupled to an end of the piston. A second biasing device can be positioned to bias the bidirectional valve in the first configuration. The bidirectional valve can be switchable from the first configuration to the second configuration in response to the amount of pressure being greater than a force with which the second biasing device biases the bidirectional valve in the first configuration.

Example #6

The control system of any of Examples #1-5 may feature the check valve being a first check valve. The control system may also feature a second check valve positioned between the second valve chamber of the bidirectional valve and the control line. The second check valve can be operable to enable fluid flow in one direction from the control line into the second valve chamber.

Example #7

The control system of any of Examples #1-6 may feature the restrictor device being a first restrictor device and the amount of fluid being a first amount of fluid. The control system may also feature a second restrictor device positioned between the second valve chamber of the bidirectional valve and the control line for restricting a second amount of fluid flowing between the second valve chamber and the control line.

Example #8

The control system of any of Examples #1-7 may feature the second check valve being in a first fluid communication pathway between the control line and the second valve chamber of the bidirectional valve. The second restrictor device can be in a second fluid communication pathway between the control line and the second valve chamber of the bidirectional valve. The first fluid communication pathway can be different from the second fluid communication pathway.

Example #9

The control system of any of Examples #1-8 may feature the well tool. The well tool can include a fluid chamber between the first port and the second port of the well tool. The well tool can include a second piston in the fluid chamber. The second piston can be moveable from (i) a first piston position to a second piston position in response fluid flow into the first port, and (ii) the second piston position to the first piston position in response to fluid flow into the second port.

Example #10

The control system of any of Examples #1-9 may feature the control system lacking electrical components. The control system can only be coupled to a single control line for operating the control system.

Example #11

A system can include a well tool. The system can include a control line having a fluid. The system can include a resettable chamber in fluid communication with the control line. The system can include a bidirectional valve in fluid communication with the control line and the resettable chamber. The bidirectional valve can be switchable between (i) a first configuration for enabling fluid flow from the control line into a first port of a well tool and from a second port of the well tool into the resettable chamber, and (ii) a second configuration for enabling fluid flow from the control line into the second port of the well tool and from the first port of the well tool into the resettable chamber. The bidirectional valve can be switchable from the first configuration to the second configuration in response to an amount of pressure being applied to the control line.

Example #12

The system of Example #11 may feature the resettable chamber including a biasing device for biasing a chamber piston in a first chamber position. The chamber piston can be movable from (i) the first chamber position to a second chamber position in response to fluid from the well tool being communicated into the resettable chamber, and (ii) the second chamber position to a third chamber position in response to additional fluid being communicated from the well tool into the resettable chamber.

Example #13

The system of any of Examples #11-12 may feature a check valve positioned between the bidirectional valve and the resettable chamber. The check valve can be operable to enable fluid flow in a single direction from the bidirectional valve into the resettable chamber.

Example #14

The system of any of Examples #11-13 may feature a restrictor device positioned between a port of the resettable chamber and the control line for restricting an amount of fluid flowing between the resettable chamber and the control line.

Example #15

The system of any of Examples #11-14 may feature the bidirectional valve including a piston. The bidirectional valve can include a first valve chamber defined by at least two sealing devices coupled to the piston. The bidirectional valve can include a second valve chamber that is different from the first valve chamber and defined at least in part by a sealing device coupled to an end of the piston. The bidirectional valve can include a biasing device positioned to bias the bidirectional valve in the first configuration. The bidirectional valve can be switchable from the first configuration to the second configuration in response to the amount of pressure being greater than a force with which the biasing device biases the bidirectional valve in the first configuration.

Example #16

The system of any of Examples #11-15 may feature a check valve positioned between the second valve chamber of the bidirectional valve and the control line. The check valve can be operable to enable fluid flow in one direction from the control line into the second valve chamber.

Example #17

The system of any of Examples #11-16 may feature a restrictor device positioned between the second valve chamber of the bidirectional valve and the control line for restricting a second amount of fluid flowing between the second valve chamber and the control line.

Example #18

The system of any of Examples #11-17 may feature the well tool including a fluid chamber between the first port and the second port of the well tool. The well tool can include a piston in the fluid chamber. The piston can be moveable from (i) a first piston position to a second piston position in response fluid flow into the first port, and (ii) the second piston position to the first piston position in response to fluid flow into the second port.

Example #19

A method can include receiving, by a bidirectional valve in a first configuration, a first amount of pressure from a control line that is in fluid communication with the bidirectional valve, the first amount of pressure being less than a force with which a biasing device is biasing the bidirectional valve in the first configuration. The method can include, based on the bidirectional valve being in the first configuration, communicating, by the bidirectional valve, fluid from (i) the control line into a first port of a well-tool component, and (ii) a second port of the well-tool component into a resettable chamber. The method can include, in response to the fluid being communicated from the bidirectional valve into the first port of the well-tool component, moving, by a piston in the well-tool component, from a first piston position to a second piston position.

Example #20

The method of Example #19 may include receiving, by the bidirectional valve and from the control line, a second amount of pressure that is greater than the force with which the biasing device is biasing the bidirectional valve in the first configuration. The method may include, in response to the second amount of pressure, switching, by the bidirectional valve, from the first configuration into a second configuration. The method may include, based on the bidirectional valve being in the second configuration, communicating, by the bidirectional valve, fluid from (i) the control line into the second port of the well-tool component, and (ii) the first port of the well-tool component into the resettable chamber. The method may include, in response to the fluid being communicated from the bidirectional valve into the second port of the well-tool component, moving, by the piston in the well-tool component, from the second piston position to the first piston position.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A control system comprising:
   a resettable chamber in fluid communication with a control line, wherein the resettable chamber comprises a biasing device for biasing a chamber piston in a first chamber position, the chamber piston being movable from (i) the first chamber position to a second chamber position in response to fluid from a well tool being communicated into the resettable chamber, and (ii) the second chamber position to a third chamber position in response to additional fluid being communicated from the well tool into the resettable chamber; and
   a bidirectional valve in fluid communication with the control line and the resettable chamber, the bidirectional valve being switchable between (i) a first configuration for enabling fluid flow from the control line into a first port of the well tool and from a second port of the well tool into the resettable chamber, and (ii) a second configuration for enabling fluid flow from the control line into the second port of the well tool and from the first port of the well tool into the resettable chamber, the bidirectional valve being switchable from the first configuration to the second configuration in response to an amount of pressure being applied to the control line.

2. The control system of claim 1, further comprising a check valve positioned between the bidirectional valve and the resettable chamber, wherein the check valve is operable to enable fluid flow in a single direction from the bidirectional valve into the resettable chamber.

3. The control system of claim 2, further comprising a restrictor device positioned between a port of the resettable chamber and the control line for restricting an amount of fluid flowing between the resettable chamber and the control line.

4. The control system of claim 3, wherein biasing device is a first biasing device, and the bidirectional valve comprises:
   a piston;
   a first valve chamber defined by at least two sealing devices coupled to the piston;
   a second valve chamber that is different from the first valve chamber and defined at least in part by a sealing device coupled to an end of the piston; and
   a second biasing device positioned to bias the bidirectional valve in the first configuration, the bidirectional valve being switchable from the first configuration to the second configuration in response to the amount of pressure being greater than a force with which the second biasing device biases the bidirectional valve in the first configuration.

5. The control system of claim 4, wherein the check valve is a first check valve, and further comprising a second check valve positioned between the second valve chamber of the bidirectional valve and the control line, wherein the second check valve is operable to enable fluid flow in one direction from the control line into the second valve chamber.

6. The control system of claim 5, wherein the restrictor device is a first restrictor device and the amount of fluid is a first amount of fluid, and further comprising a second restrictor device positioned between the second valve chamber of the bidirectional valve and the control line for restricting a second amount of fluid flowing between the second valve chamber and the control line.

7. The control system of claim 6, wherein the second check valve is in a first fluid communication pathway between the control line and the second valve chamber of the bidirectional valve, and the second restrictor device is in a second fluid communication pathway between the control line and the second valve chamber of the bidirectional valve, the first fluid communication pathway being different from the second fluid communication pathway.

8. The control system of claim 7, further comprising the well tool, wherein the well tool includes:
a fluid chamber between the first port and the second port of the well tool; and
a second piston in the fluid chamber, the second piston being moveable from (i) a first piston position to a second piston position in response fluid flow into the first port, and (ii) the second piston position to the first piston position in response to fluid flow into the second port.

9. The control system of claim 1, wherein the control system lacks electrical components and wherein the control system is only coupled to a single control line for operating the control system.

10. A system comprising:
a well tool;
a control line comprising a fluid;
a resettable chamber in fluid communication with the control line; and
a bidirectional valve in fluid communication with the control line and the resettable chamber, the bidirectional valve being switchable between (i) a first configuration for enabling fluid flow from the control line into a first port of the well tool and from a second port of the well tool into the resettable chamber, and (ii) a second configuration for enabling fluid flow from the control line into the second port of the well tool and from the first port of the well tool into the resettable chamber, the bidirectional valve being switchable from the first configuration to the second configuration in response to an amount of pressure being applied to the control line;
wherein the bidirectional valve comprises a piston, a first valve chamber defined by at least two sealing devices coupled to the piston, a second valve chamber that is different from the first valve chamber and defined at least in part by a sealing device coupled to an end of the piston, and a biasing device positioned to bias the bidirectional valve in the first configuration; and
wherein the bidirectional valve is switchable from the first configuration to the second configuration in response to the amount of pressure being greater than a force with which the biasing device biases the bidirectional valve in the first configuration.

11. The system of claim 10, wherein the biasing device is a first biasing device, and wherein the resettable chamber comprises a second biasing device for biasing a chamber piston in a first chamber position, the chamber piston being movable from (i) the first chamber position to a second chamber position in response to fluid from the well tool being communicated into the resettable chamber, and (ii) the second chamber position to a third chamber position in response to additional fluid being communicated from the well tool into the resettable chamber.

12. The system of claim 10, further comprising a check valve positioned between the bidirectional valve and the resettable chamber, wherein the check valve is operable to enable fluid flow in a single direction from the bidirectional valve into the resettable chamber.

13. The system of claim 10, further comprising a restrictor device positioned between a port of the resettable chamber and the control line for restricting an amount of fluid flowing between the resettable chamber and the control line.

14. The system of claim 10, further comprising a check valve positioned between the second valve chamber of the bidirectional valve and the control line, wherein the check valve is operable to enable fluid flow in one direction from the control line into the second valve chamber.

15. The system of claim 10, further comprising a restrictor device positioned between the second valve chamber of the bidirectional valve and the control line for restricting a second amount of fluid flowing between the second valve chamber and the control line.

16. The system of claim 10, wherein the piston is a first piston and wherein the well tool includes:
a fluid chamber between the first port and the second port of the well tool; and
a second piston in the fluid chamber, the second piston being moveable from (i) a first piston position to a second piston position in response fluid flow into the first port, and (ii) the second piston position to the first piston position in response to fluid flow into the second port.

17. A method comprising:
receiving, by a bidirectional valve in a first configuration, a first amount of pressure from a control line that is in fluid communication with the bidirectional valve, the first amount of pressure being less than a force with which a biasing device is biasing the bidirectional valve in the first configuration;
based on the bidirectional valve being in the first configuration, communicating, by the bidirectional valve, fluid from (i) the control line into a first port of a well-tool component, and (ii) a second port of the well-tool component into a resettable chamber;
in response to the fluid being communicated from the bidirectional valve into the first port of the well-tool component, moving, by a piston in the well-tool component, from a first piston position to a second piston position;
receiving, by the bidirectional valve and from the control line, a second amount of pressure that is greater than the force with which the biasing device is biasing the bidirectional valve in the first configuration;
in response to the second amount of pressure, switching, by the bidirectional valve, from the first configuration into a second configuration;
based on the bidirectional valve being in the second configuration, communicating, by the bidirectional valve, fluid from (i) the control line into the second port of the well-tool component, and (ii) the first port of the well-tool component into the resettable chamber; and
in response to the fluid being communicated from the bidirectional valve into the second port of the well-tool component, moving, by the piston in the well-tool component, from the second piston position to the first piston position.

18. The method of claim 17, wherein the biasing device is a first biasing device, and wherein the resettable chamber comprises a second biasing device for biasing a chamber piston in a first chamber position, the chamber piston being movable from (i) the first chamber position to a second chamber position in response to the fluid from the well-tool component being communicated into the resettable chamber, and (ii) the second chamber position to a third chamber position in response to additional fluid being communicated from the well-tool component into the resettable chamber.

19. The method of claim 17, wherein the piston is a first piston, and wherein the bidirectional valve comprises:
   a second piston;
   a first valve chamber defined by at least two sealing devices coupled to the second piston; and
   a second valve chamber that is different from the first valve chamber and defined at least in part by a sealing device coupled to an end of the second piston.

20. The method of claim 17, wherein the bidirectional valve, the resettable chamber, and the control line are parts of a control system that lacks electrical components, the control system being configured for controlling operation of the well-tool component.

* * * * *